United States Patent [19]

Robinson

[11] Patent Number: 5,681,079
[45] Date of Patent: Oct. 28, 1997

[54] HEADREST FOLDING MECHANISM

[75] Inventor: David Lee Robinson, Sterling Heights, Mich.

[73] Assignee: Fisher Dynamics Corporation, St. Clair Shores, Mich.

[21] Appl. No.: 560,316

[22] Filed: Nov. 17, 1995

[51] Int. Cl.$^6$ .................................................. A47C 1/036
[52] U.S. Cl. .............................. 297/61; 297/403; 297/408; 297/378.12
[58] Field of Search .............................. 297/61, 403, 408, 297/378.12

[56] References Cited

U.S. PATENT DOCUMENTS 5,181,758  1/1993  Sandvik ........................... 297/408 X

FOREIGN PATENT DOCUMENTS 2660260  10/1991  France ................................. 297/403
4548  1/1989  Japan ................................. 297/403

*Primary Examiner*—Peter M. Cuomo
*Assistant Examiner*—Rodney B. White
*Attorney, Agent, or Firm*—Harness, Dickey & Pierce P.L.C.

[57] ABSTRACT

A headrest folding apparatus is disclosed for use in a vehicle seat of the type having a fold-down seatback panel and a headrest. The headrest folding apparatus is operable for permitting the vehicle operator to release a headrest latch mechanism via actuation of a latch release mechanism for permitting angular movement of the headrest from a normal use position to a dumped position. The headrest folding apparatus also includes a movement coordinating mechanism that is operative for causing movement of the headrest from its use position to its dumped position in response to movement of the seatback panel from an upright position to a forwardly folded position. Furthermore, the headrest folding apparatus is operative for coordinating actuation of a seatback latch mechanism in concert with the headrest latch mechanism. A latch release mechanism operably interconnects the headrest latch mechanism to the seatback latch mechanism. In operation, the headrest latch mechanism is automatically shifted from its locked mode to its released mode in response to the seatback latch mechanism being actuated for unlatching the seatback panel.

17 Claims, 7 Drawing Sheets

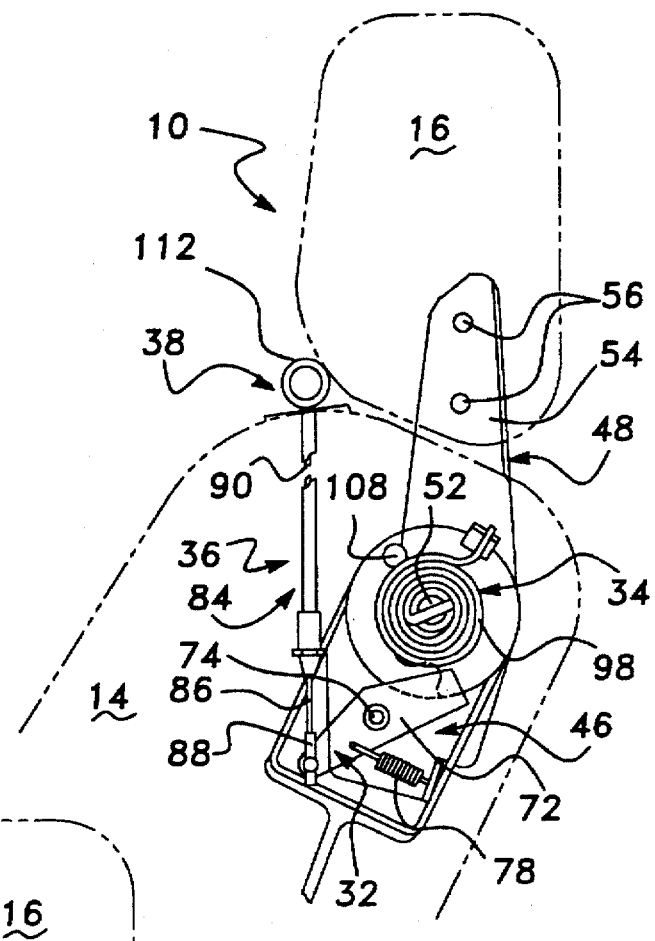

HEADREST FOLDING MECHANISM

BACKGROUND OF THE INVENTION

The present invention relates generally to vehicle seats and, in particular, to a fold-down vehicle seat equipped with a headrest folding apparatus that is operable for pivoting the headrest in response to folding of the seatback.

In many motor vehicles, the rear seat incorporates one of more fold-down seatback panels to provide enhanced access to the rear storage or trunk area. In such seating arrangements, the fold-down seatback panel is pivotally mounted at its lower end for rotation between an upright position and a forwardly folded position. In some applications, the seatback panel rests on the seat cushion when rotated to its forwardly folded position. Alternatively, the seat cushion can be pivoted from its normal horizontal position to a generally vertical position prior to the seatback panel being pivoted to its forwardly folded position. In either case, movement of the seatback panel to its forwardly folded position permits the rear seating area to communicate with the space behind the seatback panel, thereby effectively merging the trunk or storage area with the rear seating area. Conventionally, such fold-down seatback panels include a seatback latch mechanism that is operable for releasably locking the seatback panel in its upright position. The latch mechanism must be selectively actuated via operation of a release handle to unlatch the seatback panel for subsequent movement to its forwardly folded position.

As will be appreciated, motor vehicles equipped with the rear fold-down seats are extremely popular in view of the enhanced convenience and storage capacity provided. However, the space available between the front and rear seats may, in some instances, inhibit the use of fold-down seatback panels, particularly in those rear seating arrangements where the fold-down seatback panel is equipped with a headrest. To prevent the headrest from contacting the front seat, and thereby prevent complete forward folding of the seatback panel, a removable headrest is commonly utilized which can be detached from the seatback panel prior to movement of the seatback panel to its forwardly folded position. However, in such seating arrangements, means must also be provided for stowing the headrest after it has been detached from the seatback panel.

In view of the above, a need currently exists to develop a vehicle seat of the type having a fold-down seatback panel and a headrest which overcomes the known shortcomings of conventional fold-down type vehicular seats.

SUMMARY OF THE INVENTION

Accordingly, a primary object of the present invention is to provide a vehicle seat assembly having a fold-down seatback panel that is movable between a normal "upright" position and a forwardly "folded" position, a headrest that is pivotally supported from the upper end of the seatback panel, and a headrest folding apparatus operable for causing angular movement of the headrest relative to the seatback panel from a normal "use" position to a folded or "dumped" position.

A further object of the present invention is to provide the headrest folding apparatus with a headrest latch mechanism that is operable for releasably latching the headrest in its use position and which must be selectively actuated to release the headrest for subsequent movement to its dumped position.

Yet another related object of the present invention is to provide the headrest folding apparatus with a latch release mechanism that is operable for interconnecting the headrest latch mechanism with a seatback latch mechanism. The latch release mechanism prevents release of the headrest from its use position until the fold-down seatback panel is released from its upright position. It is a related object of the present invention to releasably latch the headrest in its use position when the seatback panel is latched in its upright position.

Another object of the present invention is to provide the headrest folding apparatus with a spring biasing mechanism for normally biasing the headrest toward its normal use position.

A still further object of the present invention is to provide the headrest folding apparatus with a movement coordinating mechanism that is operable for causing angular movement of the headrest from its use position to its dumped position in response to movement of the seatback panel from its upright position to its forwardly folded position.

Yet another object of the present invention is to provide a stop mechanism for maintaining the headrest in its dumped position in opposition to the biasing exerted thereon by the spring biasing mechanism when the seatback panel is in its forwardly folded position. The spring biasing mechanism is also operable for returning the headrest to its use position upon movement of the seatback panel toward its upright position.

These and other objects are provided by a headrest folding apparatus for use in a vehicle seat of the type having a fold-down seatback panel and a headrest. According to a preferred embodiment, the headrest folding apparatus is operable for permitting the vehicle operator to release a headrest latch mechanism via actuation of a latch release mechanism for permitting angular movement of the headrest from its use position to its rearwardly dumped position. The headrest latch mechanism is operable in a locked mode for releasably latching the headrest in its use position and in a released mode for permitting subsequent movement of the headrest toward its dumped position.

According to a presently preferred embodiment, the headrest folding apparatus also includes a movement coordinating mechanism that is operative for causing movement of the headrest in response to movement of the seatback panel. Furthermore, the headrest folding apparatus is operative for coordinating actuation of a seatback latch mechanism in concert with the headrest latch mechanism. The seatback latch mechanism is operable in a latched mode for releasably locking the seatback panel in its upright position and in an unlatched mode for permitting subsequent movement of the seatback panel toward its forward folded position. A latch release mechanism operably interconnects the headrest latch mechanism to the seatback latch mechanism. In operation, the headrest latch mechanism is automatically shifted from its locked mode to its released mode in response to the seatback latch mechanism being actuated for unlatching the seatback panel. More preferably, a first movable latch element associated with the headrest latch mechanism is operably interconnected via the latch release mechanism to a second movable latch element associated with the seatback latch mechanism. Thus, movement of the first latch element between a latched position and an unlatched position results in concurrent movement of the second latch element between a locked position and a released position.

BRIEF DESCRIPTION OF THE DRAWINGS

Addition, objects, features and advantages of the present invention will become apparent from analysis of the following written specification, the appended claims and the accompanying drawings in which:

FIG. 5 is a side view, similar to FIG. 3, showing a latch release mechanism that is operable for selectively releasing the headrest from its use position independently of the latched condition of the seatback panel;

FIG. 6 is a side view, similar to FIG. 5, showing an alternative latch release mechanism interconnecting the headrest latch mechanism to a seatback latch mechanism and which is operable for releasing the headrest from its use position in response to release of the seatback panel from its upright position;

DETAILED DESCRIPTION OF THE PREFERRED EMBODIMENTS

In general, the present invention is directed to a headrest folding apparatus for use with a vehicle seat assembly having a fold-down seatback and a headrest. More specifically, the present invention discloses a seat assembly which is particularly well-suited for use in motor vehicle rear seat application having a rear cargo or trunk area that is separated from a rear seating area by the fold-down seatback. However, it is to be understood that while the present invention is hereinafter disclosed in association with a particular vehicular seating arrangement, such use is merely an exemplary representation of the general type of environment in which the present invention may be readily incorporated. For example, the present invention is also well-suited for use with bench seats of the type commonly used in vans and sport utility vehicles.

Figure 1A:
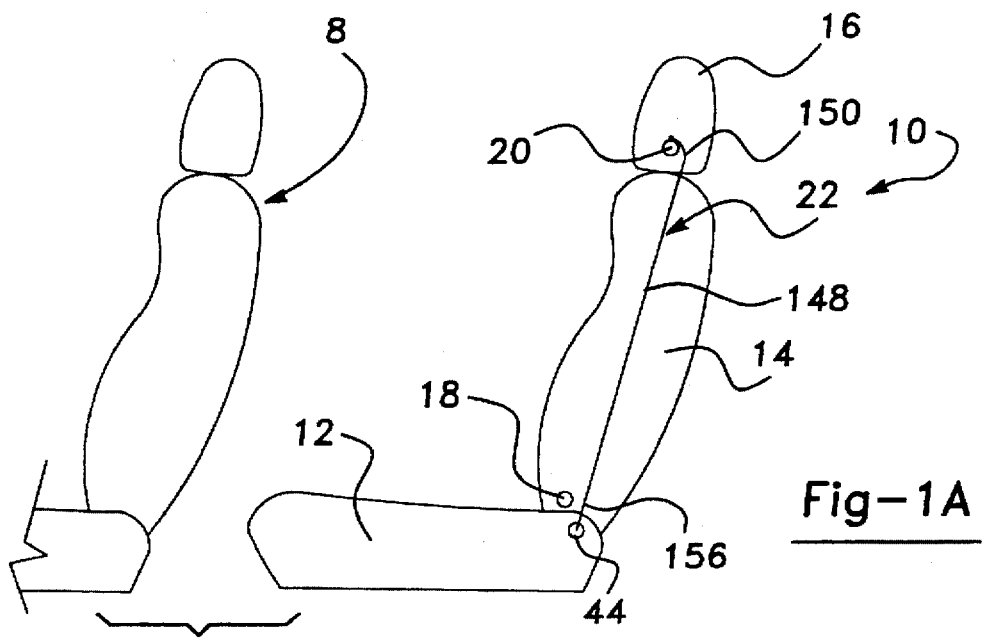
FIGS. 1A–1C are side schematic views of an exemplary motor vehicle seat assembly equipped with a headrest folding apparatus according to the present invention and which sequentially show the relative position between a fold-down seatback and a headrest when the seatback is in an upright position, an intermediate folded position, and a fully folded position, respectively.
Figure 1B:
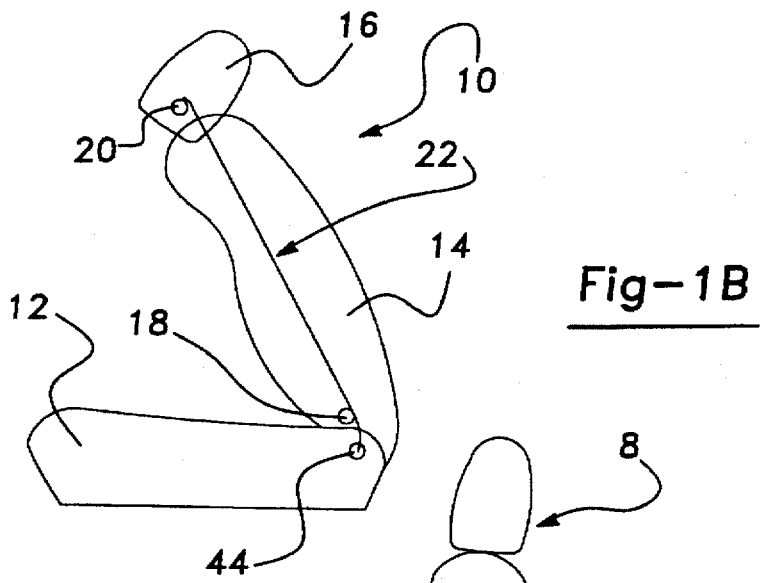
Figure 1C:
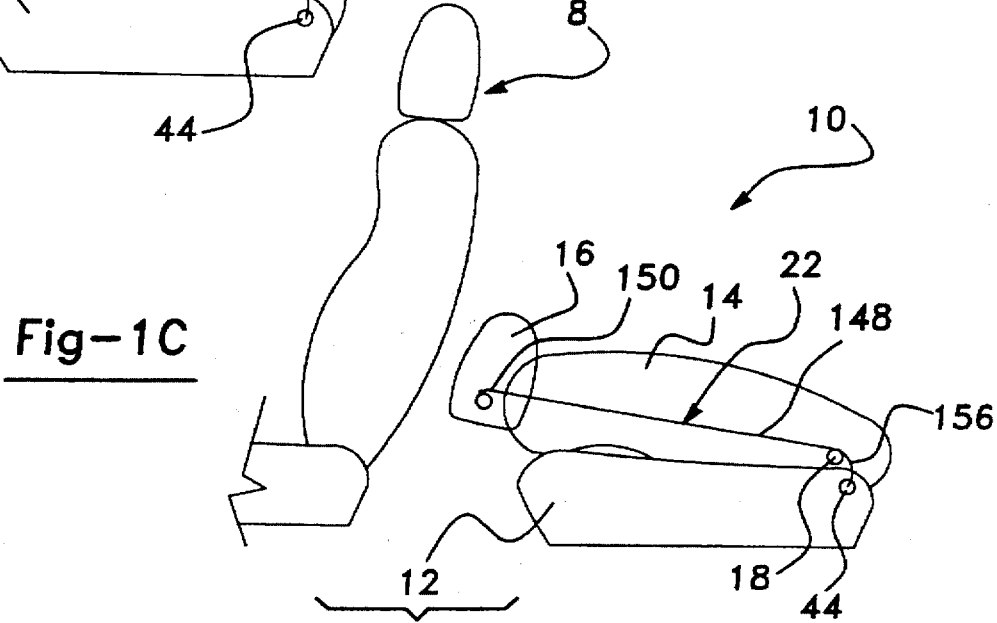

Referring now generally to the drawings in which like elements are identified with identical reference numerals throughout, and particularly to FIGS. 1A–1C, a seat assembly 10 is shown to include a seat cushion 12, a fold-down seatback 14 and a headrest 16. In the particular embodiment disclosed, seat assembly 10 is a rear seat which is shown to be located rearwardly of a front seat 8. Seatback 14 is schematically shown to be supported for angular movement relative to seat cushion 12 about pivots points 18 for movement between an "upright" position (FIG. 1A) and a forwardly "folded" position (FIG. 1C). FIG. 1B is provided to show an intermediate position of seatback 14 between the upright and folded positions. Pivot points 18 may be such that seatback 14 is mounted to seat cushion 12 (such as in a stand-alone bench seat) or directly to a portion of the motor vehicle. In addition, headrest 16 is shown supported on an upper portion of seatback 14 for angular movement relative thereto about pivot points 20 between a normal "use" position (FIG. 1A) and a rearwardly "dumped" position (FIG. 1C). In its use position, headrest 16 is generally aligned to form a continuous backrest surface with seatback 14 while in its dumped position, headrest 16 is transversely aligned with seatback 14. Again, FIG. 1B is provided for illustrating an intermediate position of headrest 16 between its normal use and rearwardly dumped positions.

FIG. 1A–1C also schematically show a headrest folding apparatus 22 interconnecting headrest 16 to seatback 14 such that angular movement of seatback 14 from its upright position to its forwardly folded position causes concurrent movement of headrest 16 from its normal use position to its rearwardly dumped position. While the specific components associated with headrest folding apparatus 22 will be disclosed hereinafter with greater specificity, it should be noted that headrest folding apparatus 22 is further operable to automatically rotate headrest 16 from its dumped position to its use position in response to seatback 14 being returned from its forwardly folded position to its upright position. Thus, the present invention is directed to a vehicular seat assembly which is particularly adapted for use in any folding seat application wherein space constraints require utilization of a seat system capable of preventing engagement of the headrest with portions of the vehicle located forwardly thereof. Specifically, in the rear seating application shown, the present invention is operable to pivot headrest 16 in a manner so as to prevent engagement thereof with the vehicle's front seat 8. Alternatively, the present invention can be used with folding front vehicular seats to prevent contact with dash mounted components.

With reference now to FIGS. 2 through 8, the various components of headrest folding apparatus 22 will now be detailed. With particular attention to FIG. 2, headrest folding apparatus 22 is shown to include first and second pivot assemblies 24 and 26 interconnecting a headrest frame 28 to a portion of a seatback frame 30 for pivotable movement relative thereto about the axis "X" defined by pivot points 20. Headrest frame 28 is confined within headrest 16 while seatback frame 30 is likewise confined within seatback 14. As will be detailed, first pivot assembly 24 includes a headrest latch mechanism 32 that is operable for normally latching headrest 16 in its use position, and a spring biasing mechanism 34 for normally biasing headrest 16 to move in a direction toward its use position. A latch release mechanism 36 includes a release operator, schematically shown by block 38, and is operably interconnected to headrest latch mechanism 32 for permitting selective actuation thereof which, in turn, permits subsequent movement of headrest 16 toward its dumped position in opposition to the biasing exerted thereon by spring biasing mechanism 34. Finally, first pivot assembly 24 also includes a stop mechanism 40 that is operable for locating and retaining headrest 16 in both of its use and dumped positions. As will also be detailed, a movement coordinating mechanism 42 interconnects pivot point 20 of second pivot assembly 26 to an anchor point 44

(FIGS. 1A–1C) for seatback 14 such that movement of seatback 14 from its upright position to its forwardly folded position causes corresponding movement of headrest 16 from its use position to its rearwardly dumped position. Moreover, stop mechanism 40 is operable to retain headrest 16 in its dumped position in opposition to the biasing exerted thereon by spring biasing mechanism 34. However, upon initial movement of seatback 14 toward its use position, stop mechanism 40 releases headrest 16 such that spring biasing mechanism 34 can thereafter assist in forcibly returning headrest 16 to its use position.

Figure 2:
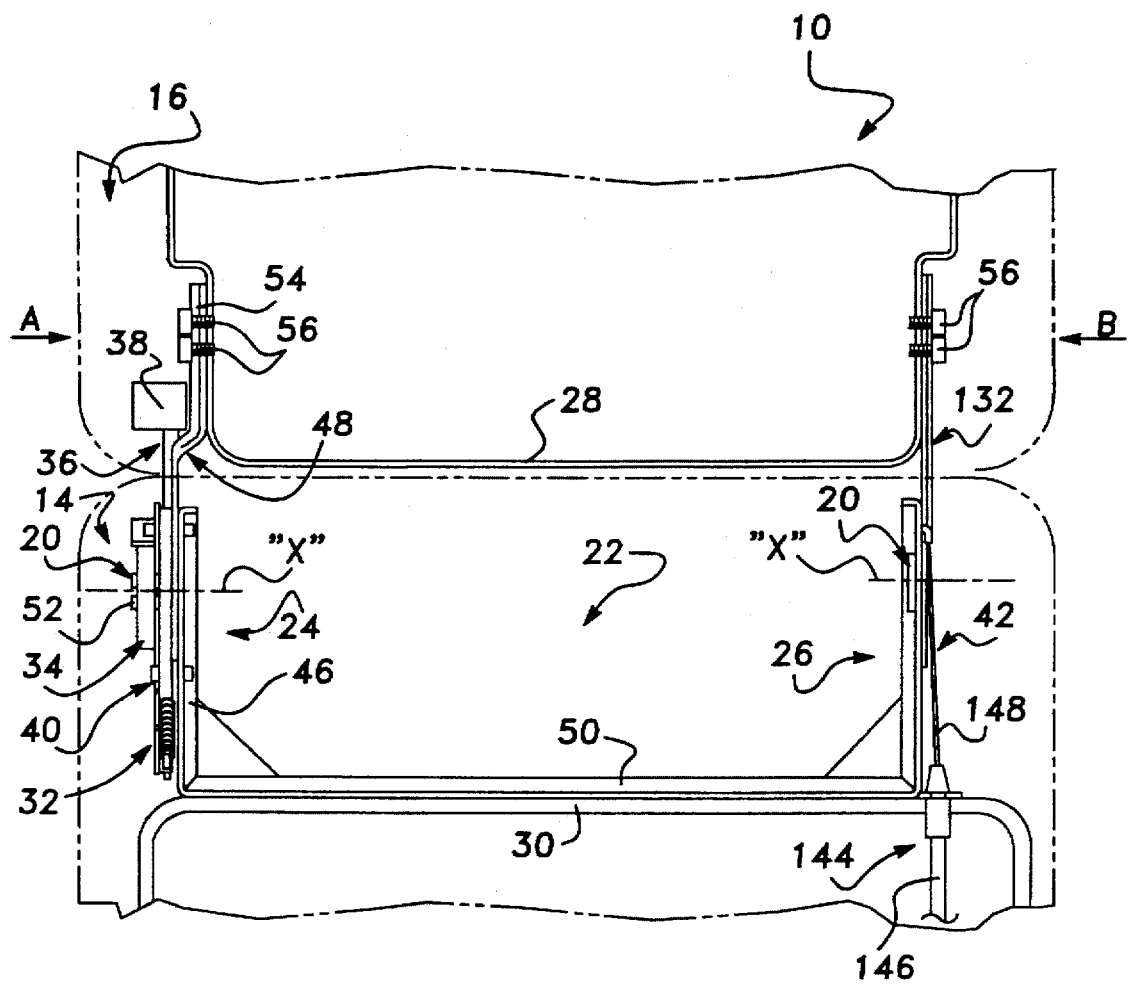
FIG. 2 is a rear view of the vehicle seat shown in FIG. 1, with conventional frame structure, upholstery and cushions removed for clarity, showing the components associated with the headrest folding apparatus interconnecting the headrest to the seatback panel.
Figure 3:
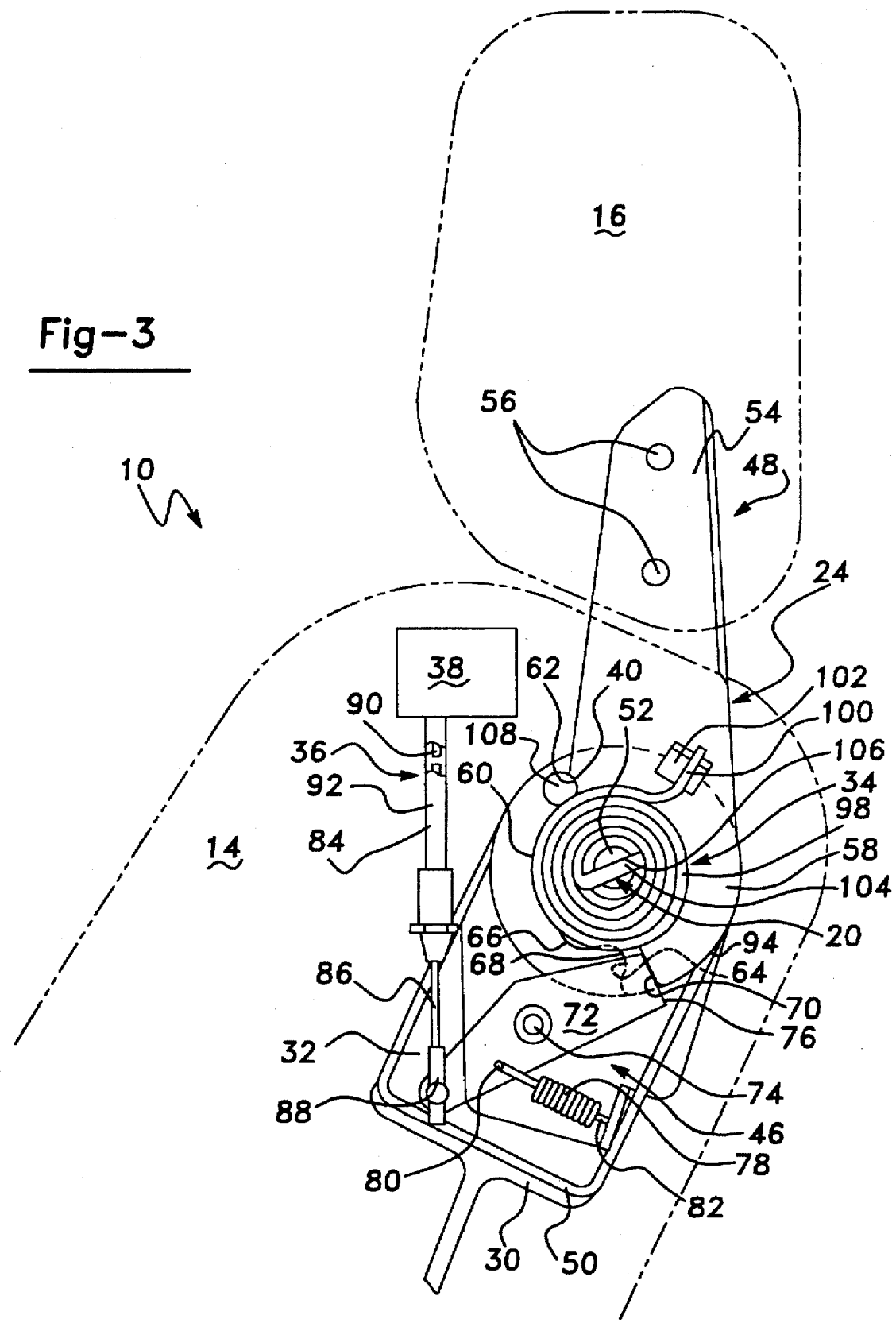
FIG. 3 is a side view of FIG. 2, taken in the direction of arrow A of FIG. 2, illustrating the headrest folding apparatus with the seatback panel in an "upright" position and the headrest in a normal "use" position.
Figure 4:
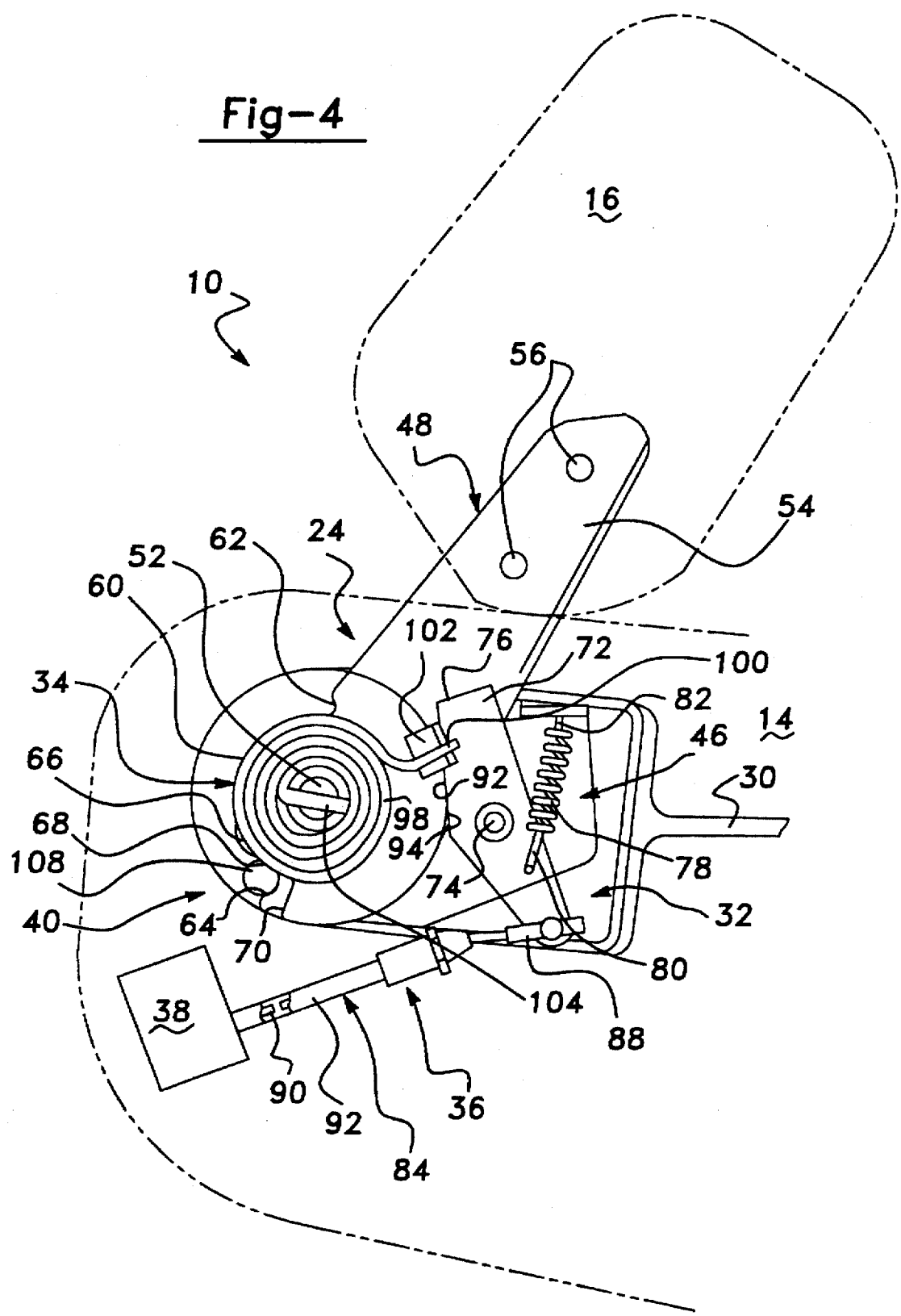
FIG. 4 is a view similar to FIG. 2 illustrating the seatback panel in a forwardly "folded" position and the headrest in a rearwardly "dumped" position.

As best seen from FIGS. 2 through 4, first pivot assembly 24 includes a support plate 46 that is fixed to seatback frame 30 and a pivot plate 48 that is fixed to headrest frame 28. In the particular embodiment shown, support plate 46 is an upwardly extending flange segment of a cross rail 50 that is suitably fixed (i.e., welded, fasteners, etc.) to seatback frame 30. Pivot plate 48 is supported from support plate 46 for pivotal movement about a hinge pin 52, defining pivot point 20. Pivot plate 48 includes an upper flange portion 54 through which fasteners 56 are driven, and a lower portion 58 through which hinge pin 52 extends. Lower portion 58 includes a general arcuate peripheral guide surface 60 having a first stop shoulder 62 at its end adjacent to upper flange portion 54 and a second stop shoulder 64 located at its opposite end. Guide surface 60 further includes a radial projection 66 located in proximity to second stop shoulder 64 which combined therewith defines a locking detent 68. Lower portion 58 of pivot plate 48 further includes a lock surface 70 that is offset from locking detent 68.

Headrest latch mechanism 32 is shown to include a locking pawl 72 mounted to support plate 46 for pivotal movement about a pivot pin 74 between a "latched" position (FIG. 3) and an "unlatched" position (FIG. 4). In particular, locking pawl 72 has an end surface 76 that is adapted to engage locking surface 70 of pivot plate 48 when located in its latched position, thereby inhibiting rearward pivotable movement of pivot plate 48 relative to support plate 46 which, in turn, inhibits pivotable movement of headrest 16 from its use position. Thus, FIG. 3 illustrates headrest latch mechanism 32 in a "locked" mode whereat headrest 16 is releasably latched in its use position. Headrest latch mechanism 32 also includes a coil spring 78 having a first end 80 connected to locking pawl 72 and a second end 82 connected to support plate 46. Spring 78 is operable for normally biasing locking pawl 72 to rotate in a first direction (i.e., counterclockwise in FIG. 3) toward its latched position.

Latch release mechanism 36 is provided for connecting release operator 38 to locking pawl 72 to permit the vehicle operator to selectively move locking pawl 72 from its latched position to its unlatched position, thereby shifting headrest latch mechanism 32 from its "locked" mode into a "released" mode. In its released mode, headrest latch mechanism 32 permits pivotal movement of headrest 16 from its use position toward its dumped position. Latch release mechanism 36 includes a cable assembly 84 having a cable 86 with a first end 88 fixed to locking pawl 72 and a second end 90 fixed to release operator 38. Cable 86 is slidably retained within a protective outer sheath 92. Thus, deliberate movement of release operator 38 causes locking pawl 72 to rotate about pivot pin 74 in a second direction (clockwise in FIG. 3), in opposition to the biasing of spring 78, so as to disengage pawl end surface 76 from locking surface 70 of pivot plate 48 and thereby place locking pawl 72 in its unlatched position. In this position, initial rearward pivotal movement of headrest 16 causes an arcuate cam surface 94 of pivot plate 48 to slidingly engage an upper cam surface 96 of locking pawl 72, thereby permitting unrestricted movement of pivot plate 48 and headrest 16 to the dumped position. As is apparent, spring 78 is continuously exerting a biasing load on locking pawl 72 for urging it toward its latched position.

As best seen from FIGS. 3 and 4, spring biasing mechanism 34 includes a torsional return spring 98 that is located adjacent to lower portion 58 of pivot plate 48 and which includes a first end 100 fixed to a retainer flange 102 extending from pivot plate 48 and a second end 104 received in a slot 106 formed in hinge pin 52. Return spring 98 is preloaded to exert a biasing force on pivot plate 48 that is adapted to forcibly urge pivot plate 48 and headrest 16 toward the use position.

Stop mechanism 40 includes a stop pin 108 extending outwardly from support plate 46 and which is engageable with first and second stop shoulders 62 and 64 of guide surface 60 to respectively define the limits of rotary movement of pivot plate 48 and to thereby establish the use and dumped positions, respectively. As shown in FIG. 3, stop pin 108 abuts first stop shoulder 62 when headrest 16 is in its use position. In this position, stop pin 108 inhibits further forward pivotal movement (i.e., counterclockwise) of headrest 16 beyond its use position while locking pawl 72 inhibits rearward pivotal movement (i.e., clockwise) of headrest 16 until latch release mechanism 36 is actuated. In contrast, FIG. 4 shows stop pin 108 abutting second stop shoulder 64 to establish the rearward limit of pivotable movement for pivot plate 48 and define the dumped position for headrest 16. To maintain headrest 16 in its dumped position and to prevent return spring 98 from forcibly returning headrest 16 to its use position, stop pin 108 is shown in FIG. 4 to be located within locking detent 68. Thus, return spring 98 is only capable of assisting in returning headrest 16 to its use position after a slight amount of forward pivotable movement of pivot plate 48 out of its dumped position which causes stop pin 108 to move out of locking detent 68 and over projection 66 on guide surface 60.

With particular reference to FIG. 5, a first version of release operator 38 is disclosed. Specifically, second end 90 of cable 86 is shown to be attached to a pull loop 112 extending out of seatback 14. Upward movement of pull loop 112 causes pivotal movement of locking pawl 72 from its latched position shown to its unlatched position. In this arrangement, release of headrest latch mechanism 32 is independent from actuation of a seatback latch device (not shown) for releasing seatback 14 from latched retention in its upright position. In contrast, FIG. 6 illustrates an alternative version of release operator 38 which includes a seatback latch mechanism 114 that is operably interconnected to headrest latch mechanism 32. In particular, seatback latch mechanism 114 includes a latch plate 116 that is supported from a portion of seatback frame (not shown) for pivotal movement about pivot pin 118. Second end 90 of cable 86 is fixed to latch plate 116. A release handle 120 is fixed to latch plate 116 for pivotably moving latch plate 116 from a locked position shown to a released position, thereby shifting seatback latch mechanism 114 from its latched mode to its unlatched mode. In its locked position, a latch segment 122 of latch plate 116 is lockingly retained within a lock groove 124 formed in a striker plate 126 mounted to suitable portion of the vehicle adjacent to the facing edge of seatback 14, thereby releasably retaining seatback 14 in its upright position.

Upon upward movement of release handle 120, latch plate 116 is pivoted to its released position whereat latch segment 122 of latch plate 116 is released from lock groove 124 of striker plate 126. This movement, in turn, causes locking pawl 72 to pivot from its latched position to its unlatched position via movement of cable 86. Moreover, return spring 98 normally biasing locking pawl 72 and latch plate 116 toward their respective latched and locked positions, as shown in FIG. 6. Thereafter, pivotal movement of headrest 16 toward its dumped position causes locking pawl 72 and latch plate 116 to be held in their respective unlatched and released positions. It will be understood that headrest latch mechanism 32 can be interconnected to any otherwise conventional seatback latch mechanism 114 via release operator 38', or an equivalent thereto, for providing the interconnection and coordinated actuation described above.

Figure 7:
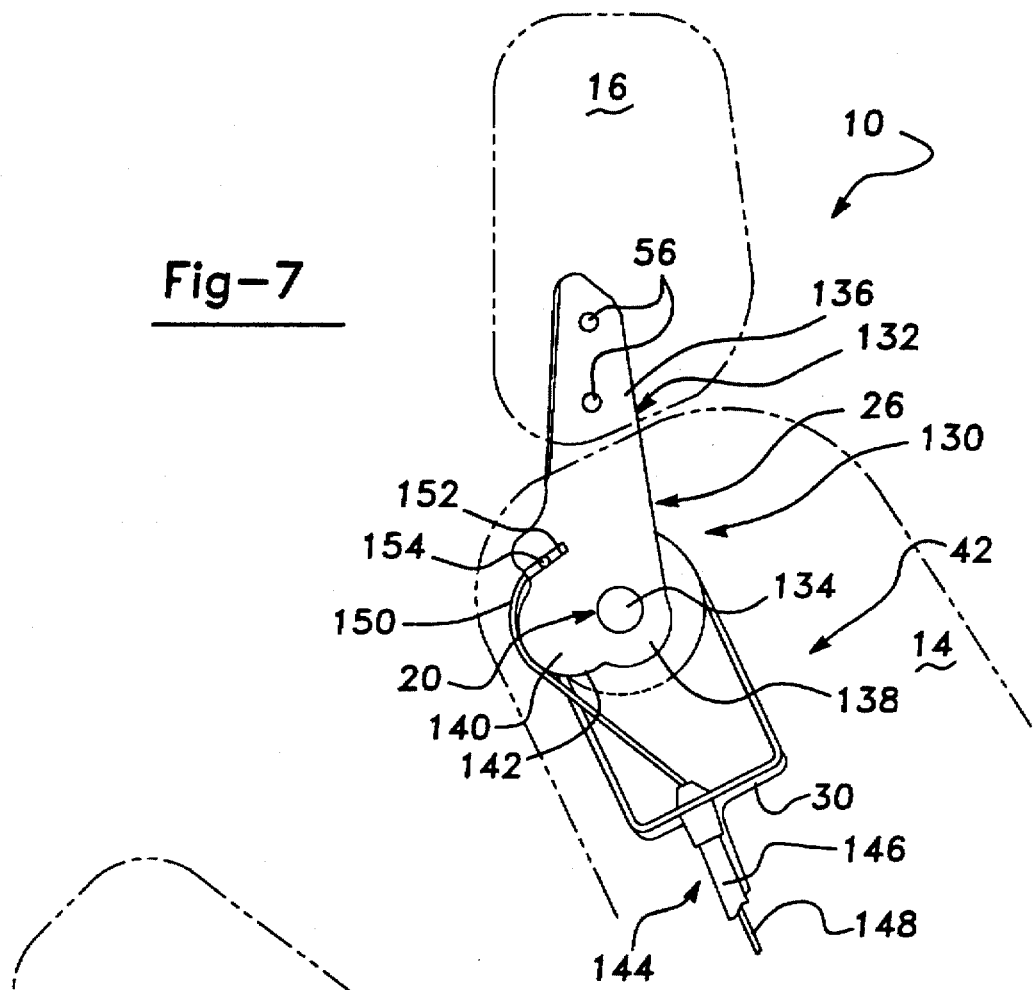
FIG. 7 is another side view, taken in the direction of arrow B of FIG. 2, illustrating a movement coordinating mechanism of the headrest folding apparatus when the seatback panel is in its upright position and the headrest is in its normal use position.
Figure 8:
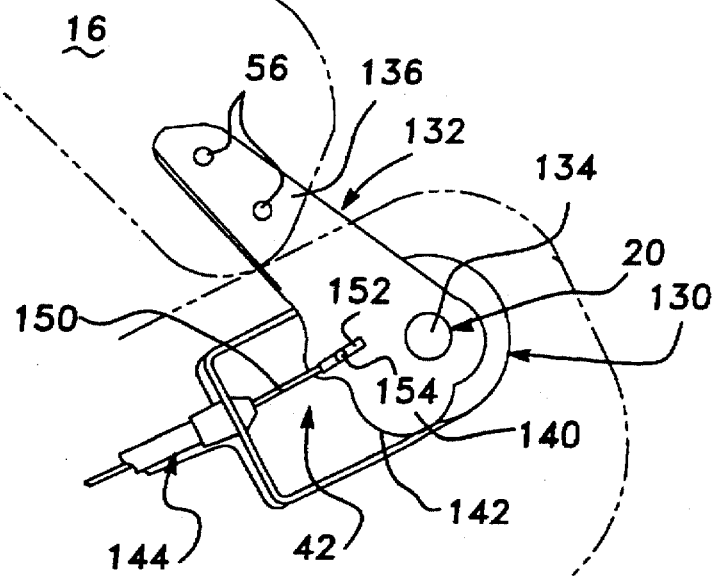
FIG. 8 is a side view, similar to FIG. 7, illustrating the seatback panel in its forwardly folded position and the headrest in its rearwardly dumped position.

With particular reference now to FIGS. 2, 7 and 8, movement coordinating mechanism 42 is shown in association with second pivot assembly 26. In operation, movement coordinating mechanism 42 functions as a coupling device for automatically causing movement of headrest 16 from its use position to its dumped position in response to movement of seatback 14 from its upright position to its forwardly folded position. Such concurrent movement is permitted following release of seatback 14 and headrest 16 from their latched conditions. As such, it is presently preferred that latch release mechanism 36, release operator 38', and seatback latch mechanism 114 of the type shown and disclosed with reference to FIG. 6 be used in association with movement coordinating mechanism 42 for the enhanced convenience it provides.

Second pivot assembly 26 includes a second support plate 130 extending from cross rail 50, and a second pivot plate 132 fixed via fasteners 56 to headrest frame 28. Second pivot plate 132 is supported from second support plate 130 for pivotal movement about a hinge pin 134 which is commonly aligned with hinge pin 52 on axis "X" to define pivot points 20. Second pivot plate 132 includes an upper flange portion 136 through which fasteners 56 are driven, and a lower portion 138 through which hinge pin 134 extends. Lower portion 138 includes a bulbous projection 140 defining a peripheral tensioning surface 142. Movement coordinating mechanism 42 includes a second cable assembly 144 having an outer sheath 146 fixed to a portion of seat cushion 12 and second support plate 130, and an inner cable 148 slidingly retained inside sheath 146. A first end 150 of cable 148 is fixed via a ferule 152 to a pin 154 extending from second pivot plate 132. Pin 154 is located above and rearward of hinge pin 134 when headrest 16 is in its use position. A second end 156 (FIG. 1) of cable 148 is fixed to seat cushion 12 at a location rear of lower pivots 18 and is shown in FIGS. 1A–1C as anchor point 44.

As seen from FIGS. 7 and 8, a portion of cable 148 adjacent to first end 150 is routed to ride on tensioning surface 142 of second pivot plate 132. Since cable 148 is of a predetermined length, pivotal movement of seatback 14 about pivot points 18 causes second pivot plate 132 to rotate about hinge pin 134 and first pivot plate 48 to rotate about hinge pin 52 for moving headrest 16 from its use position of FIG. 7 to its dumped position of FIG. 8. According to the embodiment shown, automatic return of headrest 16 to its use position is accomplished by the biasing of return spring 98 upon movement of seatback 14 toward its upright position. While movement coordinating mechanism 42 is shown in association with second pivot assembly 26, it is contemplated that it could readily have been associated with first pivot assembly 24.

Figure 9A:
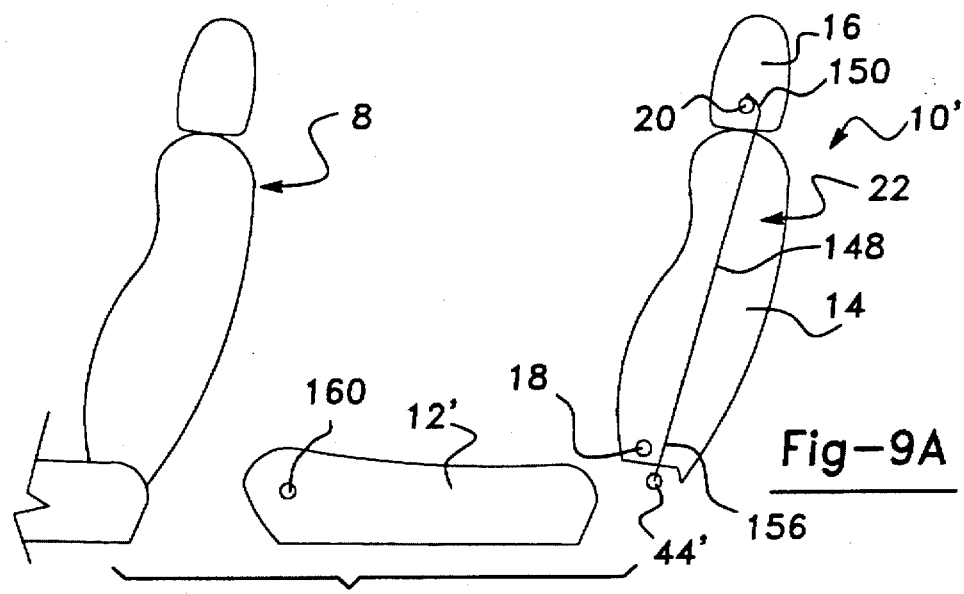
FIGS. 9A through 9C are side schematic views of an alternative vehicle seat assembly equipped with the headrest folding apparatus of the present invention and having a pivotable seat cushion.
Figure 9B:
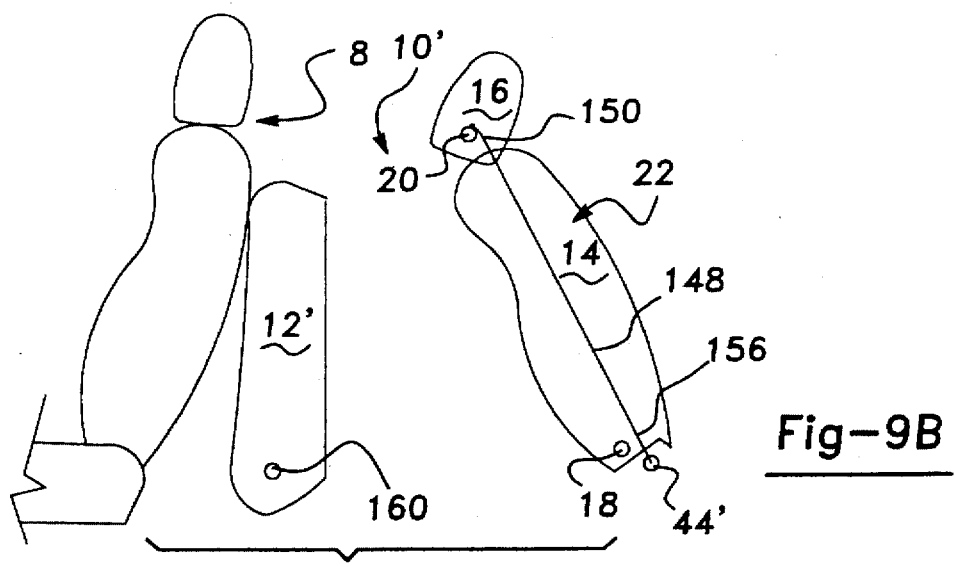
Figure 9C:
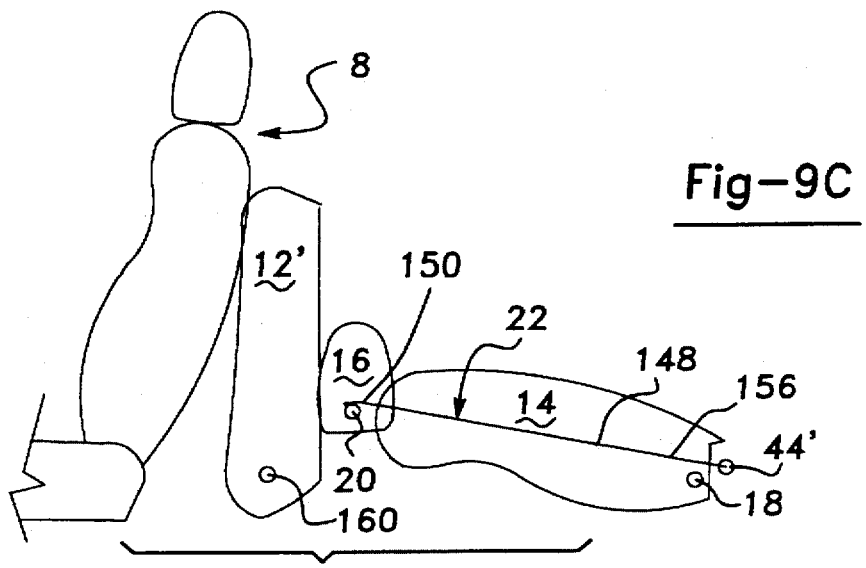

As seen, FIGS. 9A–9C are variants of FIGS. 1A–1C and disclose a seat assembly 10' having a fold-up seat cushion 12' in addition to fold-down seatback 14. Accordingly, prior to movement of seatback 14 to its forwardly folded position (FIG. 9C), seat cushion 12' is initially pivotably moved about pivot points 160 from a normal "seat" position (FIG. 9A) to an upwardly folded or "tipped" position (FIG. 9B). Thereafter, headrest folding apparatus 22 can be used in the manner previously disclosed to permit folding of headrest 16 and seatback 14. In fact, the only modification necessitated by usage of seat assembly 10' is the location of anchor point 44' being fixed to vehicle frame structure instead of to seat cushion 12. However, anchor point 44 could likewise be mounted to vehicle frame structure, if so desired, in association with seat assembly 10.

The foregoing discussion discloses and describes exemplary embodiments of the present invention. For example, it is contemplated that the headrest folding apparatus of the present invention could be easily modified to facilitate forward pivotal movement of the headrest to a forwardly dumped position instead of a rearwardly dumped position. As such, those skilled in the art will readily recognize from the above discussion, and from the accompanying drawings and claims, that various changes, modifications and variations can be made therein without departing from the true spirit and fair scope of the invention as defined in the following claims.

What is claimed is:

1. A seat assembly comprising:

a seat cushion;

a seatback supported for movement between an upright position and a folded position;

a headrest supported on said seatback for movement between a use position and a dumped position;

a headrest latch mechanism operable in a locked mode for releasably latching said headrest in said use position and in a released mode for permitting movement of said headrest from said use position toward said dumped position;

a latch release mechanism for permitting said headrest latch mechanism to be selectively shifted from said locked mode into said released mode; and a spring biasing mechanism operably secured to said headrest for normally biasing said headrest toward said use position.

2. The seat assembly of claim 1 further comprising a seatback latch mechanism operable in a latched mode for releasably latching said seatback in said upright position and in an unlatched mode for permitting movement of said seatback from said upright position toward said folded position, and wherein said latch release mechanism interconnects said headrest latch mechanism to said seatback latch mechanism such that said headrest latch mechanism is shifted from its locked mode into its released mode in response to said seatback latch mechanism being shifted from said latched mode into said unlatched mode due to actuation of said latch release mechanism.

3. The seat assembly of claim 1 further comprising a movement coordinating mechanism operable for causing movement of said headrest from said use position to said dumped position in response to movement of said seatback from said upright position to said folded position.

4. The seat assembly of claim 3 further comprising a stop mechanism for maintaining said headrest in said dumped position in opposition to the biasing exerted by said spring biasing mechanism.

5. The seat assembly of claim 1 further comprising a pivot assembly having a pivot plate secured to said headrest, a support plate secured to said seatback, and a hinge pin interconnecting said pivot plate to said support plate, said headrest latch mechanism including a locking pawl mounted on said support plate for movement between a latched position engaging a lock surface on said pivot plate and an unlatched position disengaged therefrom, and a spring member for normally biasing said locking pawl toward said latched position, and wherein said latch release mechanism is coupled to said locking pawl to permit movement thereof from said latched position to said unlatched position so as to shift said headrest latch mechanism from said locked mode into said released mode.

6. The seat assembly of claim 5 further comprising a seatback latch mechanism operable in a latched mode for releasably latching said seatback in said upright position and in an unlatched mode for permitting movement of said seatback from said upright position toward said folded position, and wherein said latch release mechanism interconnects said headrest latch mechanism to said seatback latch mechanism such that said headrest latch mechanism is shifted from its locked mode into its released mode in response to said seatback latch mechanism being shifted from said latched mode into said unlatched mode due to actuation of said latch release mechanism.

7. The seat assembly of claim 5 wherein said spring biasing mechanism is mounted between said support plate and said pivot plate for exerting a biasing force on said pivot plate which biases said headrest toward said use position.

8. The seat assembly of claim 5 further comprising a coupling interconnecting said pivot plate to a fixed anchor point, said coupling operable for causing said pivot plate to pivot about said hinge pin for moving said headrest from said use position to said dumped position in response to movement of said seatback from said upright position toward said folded position.

9. The seat assembly of claim 8 wherein said coupling includes a cable interconnected between said anchor point and said pivot plate.

10. A headrest folding apparatus for a vehicular seat assembly having a seat cushion, a fold-down seatback supported for movement between an upright position and a folded position, and a headrest supported for movement on the seatback between a use position and a dumped position, said headrest folding apparatus comprising:
  a headrest latch mechanism operable in a locked mode for releasably latching the headrest in its use position and in a released mode for permitting movement of the headrest from its use position toward its dumped position;
  a latch release mechanism for permitting said headrest latch mechanism to be selectively shifted from said locked mode into said released mode;
  a spring biasing mechanism operable for normally biasing the headrest towards its use position; and
  a movement coordinating mechanism operable for causing movement of the headrest from its use position to its dumped position in response to movement of the seatback from its upright position to its folded position.

11. The seat assembly of claim 10 further comprising a seatback latch mechanism operable in a latched mode for releasably latching the seatback in its upright position and in an unlatched mode for permitting movement of the seatback from its upright position toward its folded position, and wherein said latch release mechanism operably interconnects said headrest latch mechanism to said seatback latch mechanism for causing said headrest latch mechanism to be shifted from its locked mode into its released mode in response to said seatback latch mechanism being shifted from its locked mode into its released mode.

12. The seat assembly of claim 11 further comprising a stop mechanism for maintaining the headrest in its dumped position in opposition to the biasing exerted by said spring biasing mechanism.

13. The seat assembly of claim 12 wherein said movement coordinating mechanism includes a coupling interconnecting the headrest to a fixed anchor point, said coupling operable for causing the headrest to pivot relative to the seatback from its use position to its dumped position in response to movement of the seatback from its upright position towards its folded position.

14. A seat assembly comprising:
  a seat cushion;
  a seatback supported for movement between an upright position and a folded position;
  a headrest supported on said seatback for movement between a use position and a dumped position;
  a headrest latch mechanism operable in a locked mode for releasably latching said headrest in said use position and in a released mode for permitting movement of said headrest from said use position towards said dumped position;
  a seatback latch mechanism operable in a latched mode for releasably latching said seatback in said upright position and in an unlatched mode for permitting movement of said seatback from said upright position towards said folded position;
  a latch release mechanism interconnecting said headrest latch mechanism to said seatback latch mechanism such that said headrest latch mechanism is shifted from its locked mode into its released mode in response to said seatback latch mechanism being shifted from its latched mode into its unlatched mode;
  a spring biasing mechanism acting on said headrest for normally biasing said headrest toward said use position;
  a stop mechanism for releasably retaining said headrest in said dumped position in opposition to the biasing exerted by said spring biasing mechanism; and
  a movement coordinating mechanism interconnecting said headrest to a fixed anchor point, said movement coordinating mechanism operable for causing said headrest to move from said use position to said dumped position in response to movement of said seatback from said upright position to said folded position.

15. The seat assembly of claim 14 wherein movement of said seatback from said folded position toward said upright position releases said headrest from said stop mechanism so as to permit said spring biasing mechanism to forcibly urge said headrest to move toward said use position.

16. The seat assembly of claim 14 wherein said headrest latch mechanism includes a first latch member movable between a latched position and an unlatched position, said seatback latch mechanism includes a second latch member movable between a locked position and a released position, and wherein said latch release mechanism includes a coupling interconnecting said first latch member to said second latch member such that movement of said second latch member from its locked position to its released position causes concurrent movement of said first latch member from its latched position to its unlatched position, and further comprising means for normally biasing said first latch member towards said latched position.

17. A seat assembly comprising:

a seat cushion;

a seatback supported for movement between an upright position and a folded position;

a headrest supported on said seatback for movement between a use position and a dumped position;

a headrest latch mechanism operable in a locked mode for releasably latching said headrest in said use position and in a released mode for permitting movement of said headrest from said use position toward said dumped position;

a latch release mechanism for permitting said headrest latch mechanism to be selectively shifted from said locked mode into said released mode; and a seatback latch mechanism operable in a latched mode for releasably latching said seatback in said upright position and in an unlatched mode for permitting movement of said seatback from said upright position toward said folded position, and wherein said latch release mechanism interconnects said headrest latch mechanism to said seatback latch mechanism such that said headrest latch mechanism is shifted from its locked mode into its released mode in response to said seatback latch mechanism being shifted from said latched mode into said unlatched mode due to actuation of said latch release mechanism.

* * * * *